(12) United States Patent
Costea et al.

(10) Patent No.: US 7,757,290 B2
(45) Date of Patent: Jul. 13, 2010

(54) BYPASSING SOFTWARE SERVICES TO DETECT MALWARE

(75) Inventors: Mihai Costea, Redmond, WA (US); Yun Lin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 11/344,360

(22) Filed: Jan. 30, 2006

(65) Prior Publication Data

US 2007/0180529 A1    Aug. 2, 2007

(51) Int. Cl.
*G06F 17/00* (2006.01)
*G06F 12/14* (2006.01)
*G06F 12/16* (2006.01)
*G08B 23/00* (2006.01)

(52) U.S. Cl. .............................. 726/24; 726/22; 726/23; 713/188

(58) Field of Classification Search ................. 713/188; 726/22–24
See application file for complete search history.

(56) References Cited

U.S. PATENT DOCUMENTS

| | | | | |
|---|---|---|---|---|
| 5,745,669 | A * | 4/1998 | Hugard et al. ................... | 714/3 |
| 6,266,715 | B1 * | 7/2001 | Loyer et al. .................... | 710/22 |
| 6,347,375 | B1 * | 2/2002 | Reinert et al. .................. | 726/24 |
| 6,842,861 | B1 * | 1/2005 | Cox et al. ..................... | 713/188 |
| 7,013,482 | B1 * | 3/2006 | Krumel ........................ | 726/13 |
| 7,114,184 | B2 * | 9/2006 | Malivanchuk et al. .......... | 726/24 |
| 7,340,774 | B2 * | 3/2008 | Hursey et al. ................. | 726/22 |
| 2004/0158741 | A1 * | 8/2004 | Schneider .................... | 713/201 |
| 2004/0210796 | A1 * | 10/2004 | Largman et al. .............. | 714/20 |
| 2005/0216759 | A1 * | 9/2005 | Rothman et al. ............. | 713/200 |
| 2006/0074896 | A1 * | 4/2006 | Thomas et al. ................ | 707/4 |
| 2007/0078915 | A1 * | 4/2007 | Gassoway .................... | 707/205 |

FOREIGN PATENT DOCUMENTS

| | | | |
|---|---|---|---|
| CN | 1306251 | * | 1/2000 |
| WO | WO 2005109302 A2 | * | 11/2005 |

OTHER PUBLICATIONS

Scanning Workstation Memory for Malicious Codes using Dedicated Coprocessors by Kondi et al; Date: Mar. 2006; Publisher: ACM.*
Shim, Joshua, "Launching 'VaccineDrive' Embedded Anti-Virus Engine on USB Drive," © 2001 NSBS Corporation, <http://aving.net/newproduct/default.asp?mode=read&c_num=10685> [retrieved Feb. 9, 2006].

* cited by examiner

*Primary Examiner*—Taghi T Arani
*Assistant Examiner*—Madhuri Herzog
(74) *Attorney, Agent, or Firm*—Workman Nydegger

(57) ABSTRACT

A method, apparatus, and computer readable medium are provided by aspects of the present invention to determine whether a malware is resident on a host computer. In one embodiment, a method determines whether data that is characteristic of malware is loaded in the system memory of a host computer. More specifically, the method includes causing a device communicatively connected to a host computer to issue a request to obtain data loaded in the system memory. Then, when the requested data is received, a determination is made regarding whether the data is characteristic of malware. Since, the method causes data to be obtained directly from system memory without relying on software services on the host computer, malware that employs certain stealth techniques will be identified.

19 Claims, 5 Drawing Sheets

BYPASSING SOFTWARE SERVICES TO DETECT MALWARE

BACKGROUND

As more and more computers and other computing devices are interconnected through various networks such as the Internet, computer security has become increasingly more important, particularly from invasions or attacks delivered over a network or over an information stream. As those skilled in the art and others will recognize, these attacks come in many different forms, including, but certainly not limited to, computer viruses, computer worms, system component replacements, Trojans, RootKits, spy-ware, denial of service attacks, even misuse/abuse of legitimate computer system features, all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is antivirus software. Most antivirus software identifies malware by matching patterns within data to what is referred to as a "signature" of the malware. Typically, antivirus software scans for malware signatures when certain events are scheduled to occur, such as when data is going to be written or read from a storage device on the computer. As known to those skilled in the art and others, computer users have ongoing needs to read and write data to storage devices such as a hard drive. For example, a common operation provided by some software applications is to open a file stored on a hard drive and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

Increasingly, malware is employing stealth techniques to hide on a computer or otherwise prevent detection by programs designed to protect a computer (e.g., antivirus software, anti-spyware software, and the like). For example, malware may be distributed with a RootKit which is a type of malware that prevents the detection of other malware. Those skilled in the art and others will recognize that a RootKit acts as a "man-in-the-middle," monitoring and altering communications between an operating system and programs designed to protect a computer from malware.

For illustrative purposes and by way of example only, FIG. 1 depicts how a RootKit is able to control the information that is made available to software designed to protect a computer 100 from malware. As illustrated in FIG. 1, the computer 100 includes an application program 102, an operating system 104, a hardware platform 106, and a RootKit 108. Also, the operating system 104 includes an interface 110 that provides services in the form of an Application Programming Interface ("API") to application programs installed on the computer 100. The application program 102 performs actions designed to protect the computer 100 from malware. For example, the application program 102 may scan files for malware "on access" when a user attempts to access a file stored on a storage device (not illustrated) included in the hardware platform 106. However, as illustrated in FIG. 1, the application program 102 relies on services provided by the operating system 104 to access data on the hardware platform 106. Moreover, the computer 100 is infected with the RootKit 108 that "hooks" into the operating system 104 where it intercepts calls used to perform basic functions on the computer 100. If an application program attempts to list the contents of a directory containing one or more files used by the RootKit 108, the RootKit 108 will censor the file name from the list. Similarly, the RootKit 108 may hide entries in the system registry, process list, and the like, thereby controlling all of the information that the RootKit 108 wants hidden. As a result, the application program 102 is unable to identify the RootKit 108 and any associated malware that the RootKit 108 is designed to hide.

SUMMARY

Generally described, a method, apparatus, and computer readable medium are provided by aspects of the present invention to determine whether a malware is resident on a host computer. In one embodiment, a method or routine is provided to determine whether data that is characteristic of malware is loaded in the system memory of a host computer. More specifically, the method includes causing a device communicatively connected to a host computer to issue a request to obtain data loaded in the system memory. Then, when the requested data is received, a determination is made regarding whether the data includes data characteristic of malware. Since, the method causes data to be obtained directly from system memory without relying on software services on the host computer, malware that employs certain stealth techniques will be identified.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
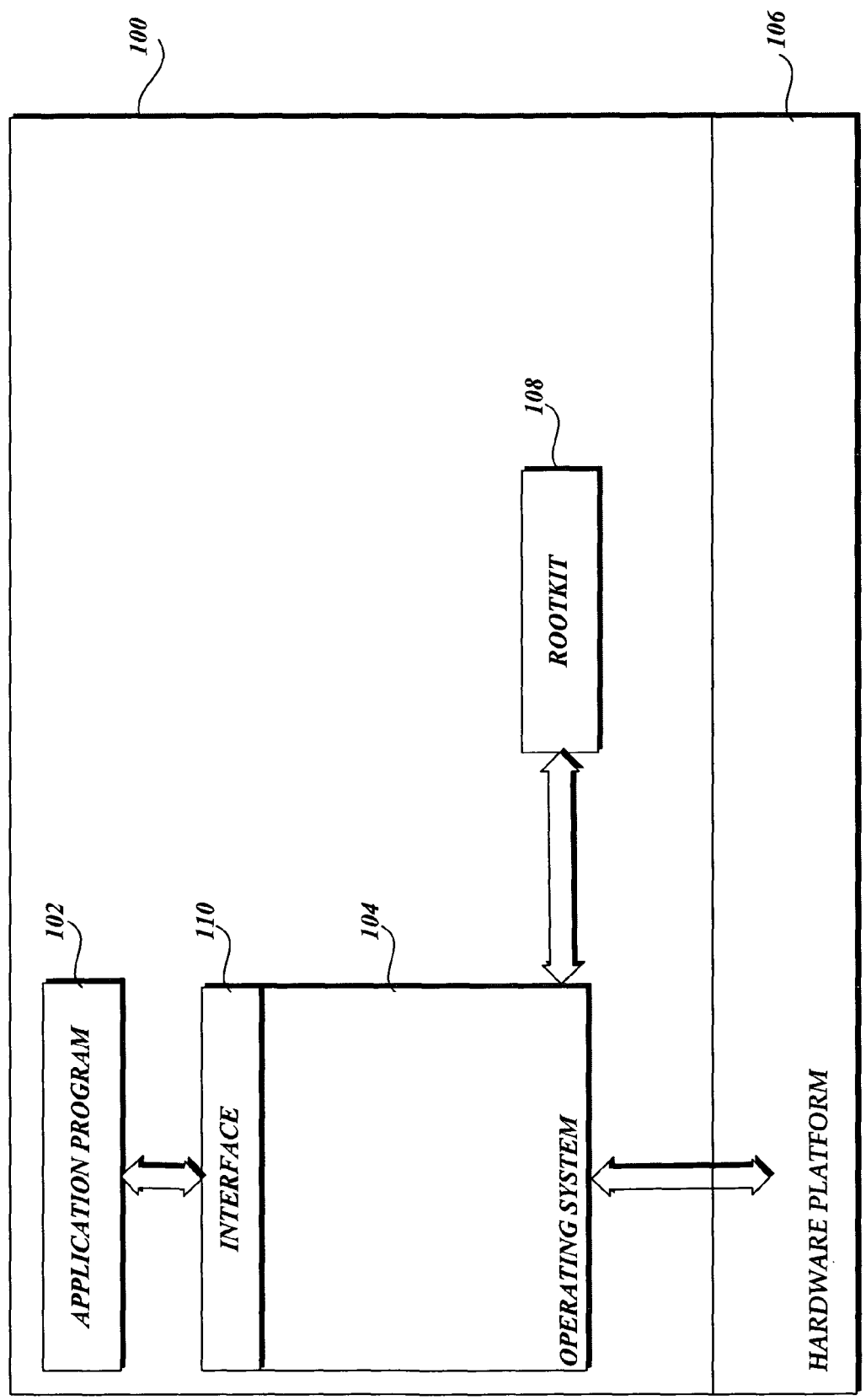
FIG. 1 is an exemplary block diagram that illustrates how one type of malware exploits the hierarchical structure between system components of a modern computer.

The present invention may be described in the general context of computer-executable instructions, such as program modules, being executed by a computer. Generally described, program modules include routines, programs, applications, widgets, objects, components, data structures, and the like that perform particular tasks or implement particular abstract data types. The present invention may also be practiced in distributed computing environments where tasks are performed by remote processing devices that are linked through a communications network. In a distributed computing environment, program modules may be located on local and/or remote computer storage media.

While aspects of the present invention will primarily be described in the context of determining whether data that is characteristic of malware is present in the system memory of a computer, those skilled in the relevant art and others will recognize that aspects of the invention are also applicable to other areas than those described. In any event, the following description first provides an overview of an environment in which aspects of the invention may be implemented. Then, a method or routine that implements aspects of the invention is described. However, the illustrative examples provided herein are not intended to be exhaustive or to limit the claimed subject matter to the precise forms disclosed. Similarly, any steps described herein may be interchangeable with other steps or combinations of steps in order to achieve the same result.

Now with reference to FIG. 2, an exemplary hardware platform of a host computer 200 suitable to illustrate aspects of the present invention will be described. Those skilled in the art and others will recognize that the host computer 200 depicted in FIG. 2 may be any one of a variety of devices including, but not limited to, personal computing devices, server-based computing devices, mini- and mainframe computers, laptops, personal digital assistants ("PDAs"), or other electronic devices having some type of memory. For ease of illustration and because it is not important for an understanding of the present invention, FIG. 2 does not show the typical components of many computers, such as a keyboard, a mouse, a printer, a display, etc. However, in the embodiment illustrated in FIG. 2, the hardware platform on the host computer 200 includes a Central Processing Unit ("CPU") 202, a system memory 204, a memory controller 206, a hot-swappable hard drive 208, the input/output ("I/O") interfaces 210 and 212 that are connected to the FireWire device 214 and the USB device 216, respectively. Moreover, as further illustrated in FIG. 2, the CPU 202, system memory 204, hot-swappable hard drive 208, and I/O interfaces 210 and 212 are each communicatively connected to the memory controller 206 via the buses 218, 220, 222, 224, 226, and 228.

Figure 2:
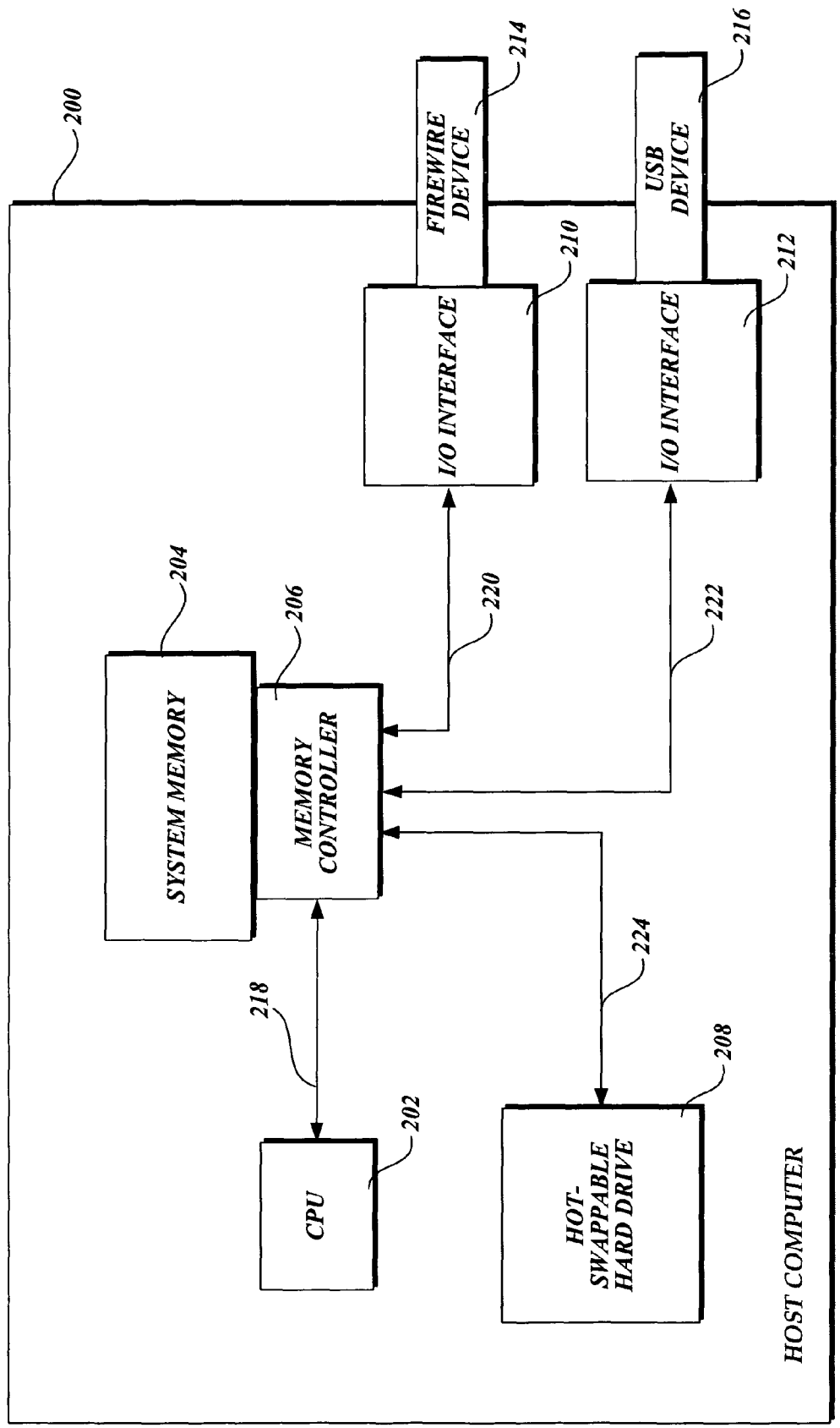
FIG. 2 is an exemplary block diagram of a computer that illustrates an environment in which aspects of the present invention may be implemented.

As illustrated in FIG. 2, the host computer 200 includes a memory controller 206 communicatively connected to the system memory 204. Those skilled in the art and others will recognize that the memory controller 206 is a hardware device that manages input/output ("I/O") between the system memory 204 and other components on the computer 200. In this regard, the memory controller 206 interfaces the system memory 204 with other hardware components by, among other things, (1) accepting requests to read/write data to the system memory 204, (2) generating the necessary signals to satisfy the requests, and (3) forwarding any requested data loaded in the system memory 204 back to a requesting component. Moreover, the memory controller 206 may provide a direct connection or Direct Memory Access ("DMA") from the system memory 204 to components that connect to the host computer 200 such as storage devices (e.g., hard drives, memory cards, flash drives), boards, cards, and the like. In providing a direct connection from the system memory 204 to components on the host computer 200, any one of the number of protocols may be used to facilitate communication, including but not limited to, Universal Serial Bus ("USB"), FireWire (also known as "IEEE 1394" or "iLink"), Advanced Graphic Port ("AGP"), Personal Computer Memory Card International ("PCMCI"), Peripheral Component Interconnect ("PCI"), PCI-X, Small Computer System Interface ("SCSI"), and the like. Typically, a memory controller is integrated into what is commonly known as a "system chipset" of a computer. However, those skilled in the art and others will recognize that a memory controller may be integrated into other hardware components, such as the CPU 202. Thus, the architecture of the hardware platform illustrated in FIG. 2 is a highly simplified example with a component architecture that should be construed as exemplary and not limiting.

As illustrated in FIG. 2, the host computer 200 includes a CPU 202 that is communicatively connected to the memory controller 206 by the bus 218. Those skilled in the art and others will recognize that the CPU 202 serves as the computational center of the host computer 200 by supporting the execution of program instructions. In this regard, an operating system (not illustrated) causes instructions that are scheduled for execution to be loaded from a storage device (e.g., hard drive) into the system memory 204. Then, the CPU 202 implements program functionality by sequentially "fetching" and "executing" instructions loaded in the system memory 204. Unfortunately, in an infected computer, instructions associated with malware may be loaded in the system memory 204 and executed by the CPU 202. For example, as described above, application programs designed to identify malware typically rely on services provided by software components (e.g., operating system, drivers, and the like) on the host computer 200 to access data from the hardware platform. However, malware may intercept calls used to access data on a hardware platform. In this instance, application programs designed to identify malware are prevented from accessing data that indicates a computer is infected.

In one exemplary embodiment, functionality of the present invention is provided on a hardware device that connects to a host computer through an external port. For example, as depicted in FIG. 2, the host computer 200 includes the I/O interface 210 with an external port that connects the FireWire device 214 to the host computer 200. In this regard, the bus 220 that connects the I/O interface 210 and the FireWire device 214 to the memory controller 204 uses a "Peer-to-Peer" architecture to transfer data. Similarly, the I/O interface 212 provides an external port for connecting the USB device 216 to the host computer 200. In this instance, the bus 222 that connects the I/O interface and the USB device 216 to the memory controller 204 adheres to a "Master-Slave" architecture in which the memory controller 206 dictates how data flows between the system memory 204 and the USB device 216. In another embodiment, functionality implemented by the present invention is provided on a component that connects to the host computer 200 on an internal connection. For example, in the embodiment depicted in FIG. 2, the host computer 200 includes a hot-swappable hard drive 208 that is connected to the memory controller 204 by the bus 224.

Generally described, aspects of the present invention are directed at determining whether a computer, such as the host computer 200 depicted in FIG. 2, is infected with malware without using software services on the host computer. More specifically, data that may be indicative of malware is directly accessed from the system memory 204 of a host computer without relying on an operating system, drivers, on the host computer to access the data. As a result, malware that implements certain stealth techniques will be detected by the present invention.

Those skilled in the art and others will recognize that FIG. 2 is a simplified example of a host computer 200 suitable to provide a device that implements functionality of the present invention with needed data. However, actual embodiments of the host computer 200 will have additional components not illustrated in FIG. 2 or described in the accompanying text. Thus, the component architecture illustrated in FIG. 2 should be construed as exemplary and not limiting as aspects of the present invention may be implemented with computers that implement different architectures.

Now with reference to FIG. 3, software components that implement aspects of the present invention will be described. In this exemplary embodiment, the software components are stored on the FireWire device 214, briefly described above with reference to FIG. 2. However, any number of devices may be used to store the software components that interface with a host computer. In any event, in the exemplary embodiment depicted in FIG. 3, the FireWire device 214 includes a scan engine 300, generic drivers 302, a user interface 304, a processing routine 306, a signature database 308, and an update system 310.

Figure 3:
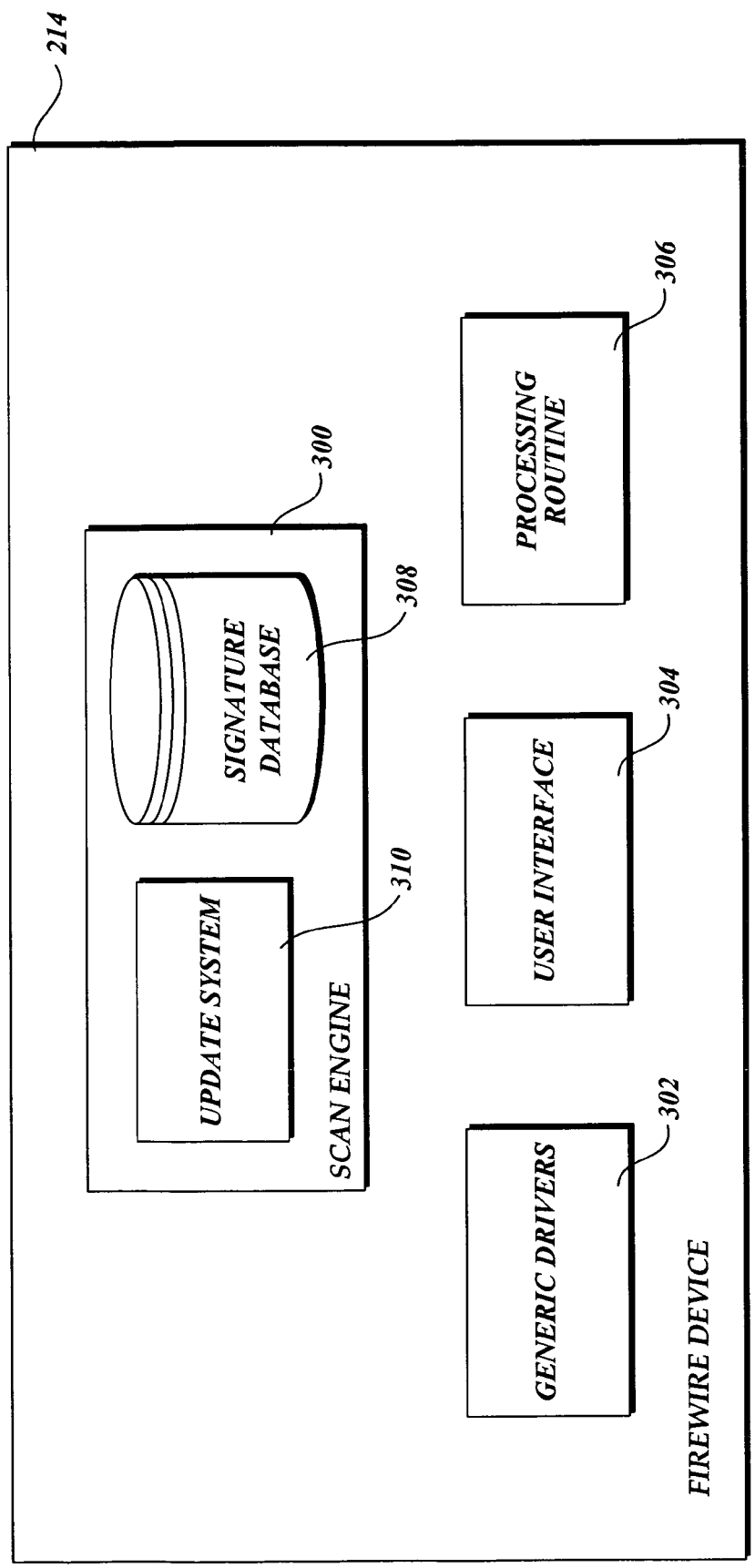
FIG. 3 is an exemplary block diagram of a FireWire device with software components suitable to detect malware on a host computer.

As illustrated in FIG. 3, the FireWire device 214 includes a processing routine 306. Since different aspects of the processing routine 306 are described below with reference to FIG. 4, a detailed description of the routine 306 will not be provided here. However, generally described, the processing routine 306 manages communication between a device that implements the present invention, such as the FireWire device 214, and a host computer. In this regard, the processing routine 306 causes requests to be issued from the FireWire device 214 so that data loaded in system memory on the host computer may be obtained. When the requested data is received, the processing routine 306 uses other software components on the FireWire device 214 to determine whether the data is characteristic of malware.

As further illustrated in FIG. 3, the FireWire device 214 includes a scan engine 300 configured to determine whether incoming data is characteristic of malware. One technique employed by some existing programs to identify malware includes collecting various malware data samples "in the wild." Then, data from each identified malware is processed with a hash function that converts the data, or a characteristic subset of the data, into a signature that uniquely identifies the malware. The scan engine 300 illustrated in FIG. 3 may employ a technique of scanning data obtained from the system memory of a host computer for a match to signatures that are derived from malware. In this regard, signatures of known malware are typically stored in a centralized location, such as the signature database 308. Thus, in this embodiment, the scan engine 300 compares data loaded in the system memory of a host computer with signatures of malware that are stored from the signature database 308. However, it should be well understood that the techniques used to detect malware described herein should be construed as exemplary and not limiting, as the scan engine 300 may employ any one of a number of existing, or yet to be developed, malware detection techniques.

Since new malware is constantly being created and released on communication networks, the scan engine 300 may be updated to detect new malware. In this regard, the scan engine 300 includes an update system 310 for obtaining software updates from an anti-malware software provider. For example, signatures derived from malware may be obtained and stored in the signature database 308 by the update system 310. However, since the functionality for obtaining software updates from an anti-malware software are generally known in the art, further description of the techniques implemented by the update system 310 will not be provided here.

If a host computer is infected, feedback may be provided to indicate that malware was identified. For example, the FireWire device 214 illustrated in FIG. 3 includes a user interface 304 for communicating with a user. In accordance with one embodiment, the user interface 304 employs a light emitting diode ("LED") (not illustrated) to communicate with a user. For example, if malware is identified, the user interface 304 causes a LED to emit an indicator that the host computer is infected. However, in alternative embodiments, the user interface 304 is a graphically based system that provides a user with options in performing searches for malware.

As further illustrated in FIG. 3, the FireWire device 214 includes the generic drivers 302. As mentioned previously, software on a host computer is bypassed by aspects of the present invention to determine whether a host computer is infected. Instead, the hardware on a host computer is directly accessed by aspects of the present invention to obtain data directly from system memory. In this regard, the generic drivers 302 provide a way for the FireWire device 214 and associated software components to directly interface with hardware on a host computer. For example, the generic drivers 302 provide a way for the processing routine 306 to interface with a memory controller on a host computer.

Now with reference to FIG. 4, the processing routine 306 mentioned briefly with reference to FIG. 3 will be described in further detail. However, as a preliminary matter, the processing routine 306 performs an analysis for malware when a device (e.g., the FireWire device 214) that stores the routine 306 is communicatively connected to a host computer. In this regard, a communication link suitable to access data in system memory on a host computer will be established so that the processing routine 306 may determine whether a computer is infected.

Figure 4:
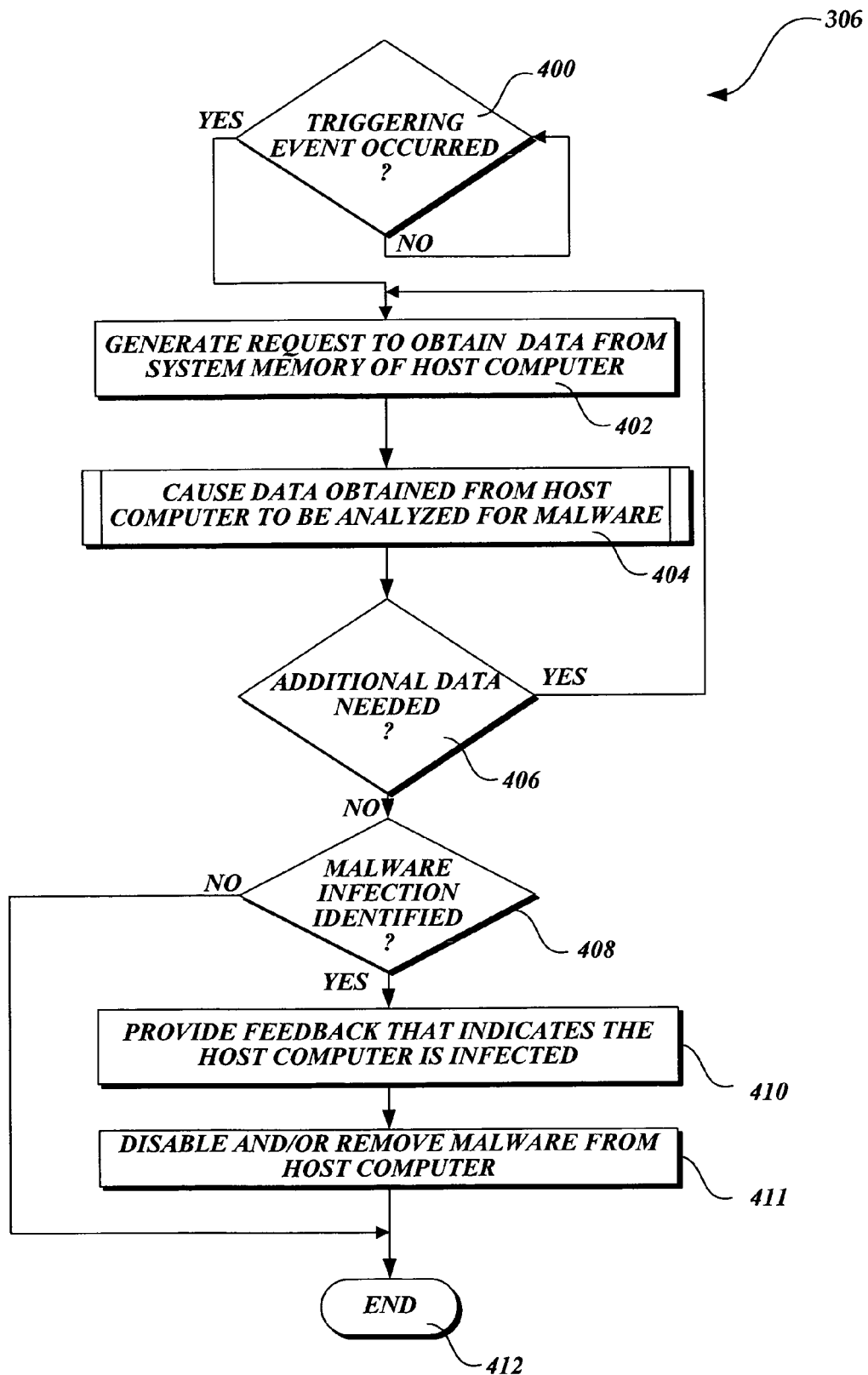
FIG. 4 is a functional flow diagram for performing an exemplary routine that determines whether a malware is resident in the system memory of a host computer.

As illustrated in FIG. 4, the processing routine 306 begins at decision block 400 where a determination is made whether a triggering event to perform an analysis for malware occurred. In accordance with one embodiment, the processing routine 208 causes data loaded into the system memory of a host computer to be analyzed for malware at regular intervals. For example, the processing routine 306 may cause a scan for malware to be performed every second, minute, hour, etc. In this embodiment, the triggering event that is identified by the routine 306 at block 400 occurs when the interval between the analysis for malware expires.

In another embodiment, a randomly generated triggering event is identified by the processing routine 306 at block 400. More specifically, previously developed software may be used by the routine 306 to cause a host computer to randomly interrupt the current flow of program execution. For example, an Advanced Programmable Interrupt Controller ("APIC") included on modern computers may be used by previously developed systems to interrupt program execution at random so that flow of program execution may be routed to the processing routine 306.

At block 402, the processing routine 306 generates a request to obtain a set of data that is loaded in the system memory of a host computer. More specifically, a request is generated and communicated from a device that stores the processing routine 306 to a memory controller that manages access to the host computer's system memory. In response, the memory controller accesses the host computer's system memory and communicates the requested data back to the processing routine 306.

In the embodiment of the processing routine 306 illustrated in FIG. 4, the request generated at block 402 is directed at initially obtaining highly relevant data that is most useful in determining whether a host computer is infected with malware. As described in further detail below, for a definitive determination regarding the malware state of the host computer, additional data may be requested so that a definitive determination can be made. For example, some operating systems use various data structures that are stored in the system memory of a host computer to manage the execution of programs. In one embodiment, an initial request made at block 402 is directed at obtaining data from areas of system memory that are more significant in performing a scan for malware. For example, data stored in areas of system memory known as a disk cache, process table, service dispatch table, and the like, will typically be requested at block 402. However, those skilled in the art and others will recognize that other types of data may be obtained at block 402 and the examples provided above should not be construed as exemplary.

It should be well understood that the request generated at block 402 may be configured so that the performance of a host computer is not affected. For example, those skilled in the art and others will recognize that access to data in system memory may be granted based on priority. In this regard, the processing routine 306 may issue a "low priority" request for data, at block 402, that is satisfied after other higher priority requests. As a result, the functionality implemented by the processing routine 306 is performed "in the background" without interfering in the host computer's ability to execute other programs.

At block 404, the processing routine 306 causes the data obtained from the system memory of a host computer, at block 402, to be analyzed for malware. As described with reference to FIG. 3, one aspect of the present invention is a scan engine 300 that is configured to determine whether incoming data is characteristic of malware. However, since the techniques that may be used by the scan engine 300, at block 402, to determine whether a host computer is infected are described above, further description of these techniques will not be provided here.

At decision block 406, a determination is made regarding whether additional data is needed to make a definitive determination regarding whether a host computer is infected with malware. As mentioned previously, the processing routine 306 initially requests a set of highly relevant data that is processed by the scan engine 300, at block 404. In performing the analysis, the scan engine 300 may be able to definitively determine that the host computer is either infected or not infected with malware. However, the scan engine 300 may not be able to definitively identify the malware state of the host computer with the data that was obtained at block 404. If additional data is needed, the processing routine 306 proceeds back to block 402, and blocks 402 through 406 repeat until a definitive determination regarding the malware state of a host computer is made. Conversely, if additional data is not needed, the routine 306 proceeds to block 408, described below.

It should be well understood that by obtaining and analyzing the most relevant data first, the processing routine 306 minimizes the performance overhead required to determine whether a host computer is infected with malware. For example, in some instances, substantial amounts of data in the system memory of a host computer may not be processed by the scan engine 300. However, those skilled in the art and others will recognize that the processing routine 306 could be configured differently. For example, the processing routine 306 could obtain all of the data loaded in the system memory of a host computer when searching for malware. Thus, the embodiment of the processing routine 306 described with reference to FIG. 3 should be construed as exemplary and not limiting.

At decision block 408, the processing routine 306 determines whether a host computer is infected with malware. If decision block 408 is reached, data loaded and obtained from the system memory of a host computer was sufficient to definitively determine the malware infection state of a host computer. As described previously, in one embodiment, the scan engine 300 (FIG. 3) performs an analysis of data obtained from a host computer and forwards the results of the analysis to the processing routine 306. At block 408, the processing routine 306 uses the results generated by the scan engine 300 to determine whether the host computer is infected. In this regard, if a determination is made that the host computer is not infected with malware, the processing routine 306 proceeds to block 412 where it terminates. Conversely, if a determination is made that the host computer is infected, the processing routine 306 proceeds to block 410.

At block 410, the processing routine 306 provides feedback to a user that indicates a host computer is infected with malware. As mentioned previously, a hardware device that implements the present invention may be configured to communicate information to a user. For example, the FireWire device 214 illustrated and described above with reference to FIG. 3 includes a user interface 304 that may provide feedback which indicates that the host computer is infected, at block 410. As mentioned previously, in one embodiment, the user interface 304 uses a LED to indicate that a host computer is infected. However, other types of feedback may be provided at block 410 to indicate that a malware infection exists.

At block 411, the malware identified on a host computer is disabled and/or removed. If block 411 is reached, data obtained from the system memory of a host computer was sufficient to definitively determine that the computer is infected. Some malware that are resident in the system memory of a host computer implement self-preservation techniques designed to prevent removal of the malware. At block 411, actions designed to disable a malware which may include, but are not limited to, killing processes, deleting files, removing entries in configuration files, and the like may be performed to disable a malware that performs certain self-preservation techniques. Once a malware has been disabled, existing software systems may be used to completely remove or "disinfect" the host computer. Then, the processing routine 306 proceeds to block 412, where it terminates.

Now with reference to FIG. 5, an embodiment of the present invention in which a secondary computer is configured to determine whether a host computer is infected with malware will be described. In this regard, the pictorial depiction in FIG. 5 includes the host computer 200 (FIG. 2) and a secondary computer 500 that are communicatively connected by the direct connection link 502. Similar to the description provided above, any one of the number of existing or yet to be developed protocols may be used to facilitate communication between the host computer 200 and the secondary computer 500. For example, the direct connection link 502 may be a USB connector, FireWire connector, etc. that connects to external ports provided by the host computer 200 and the secondary computer 500.

Figure 5:
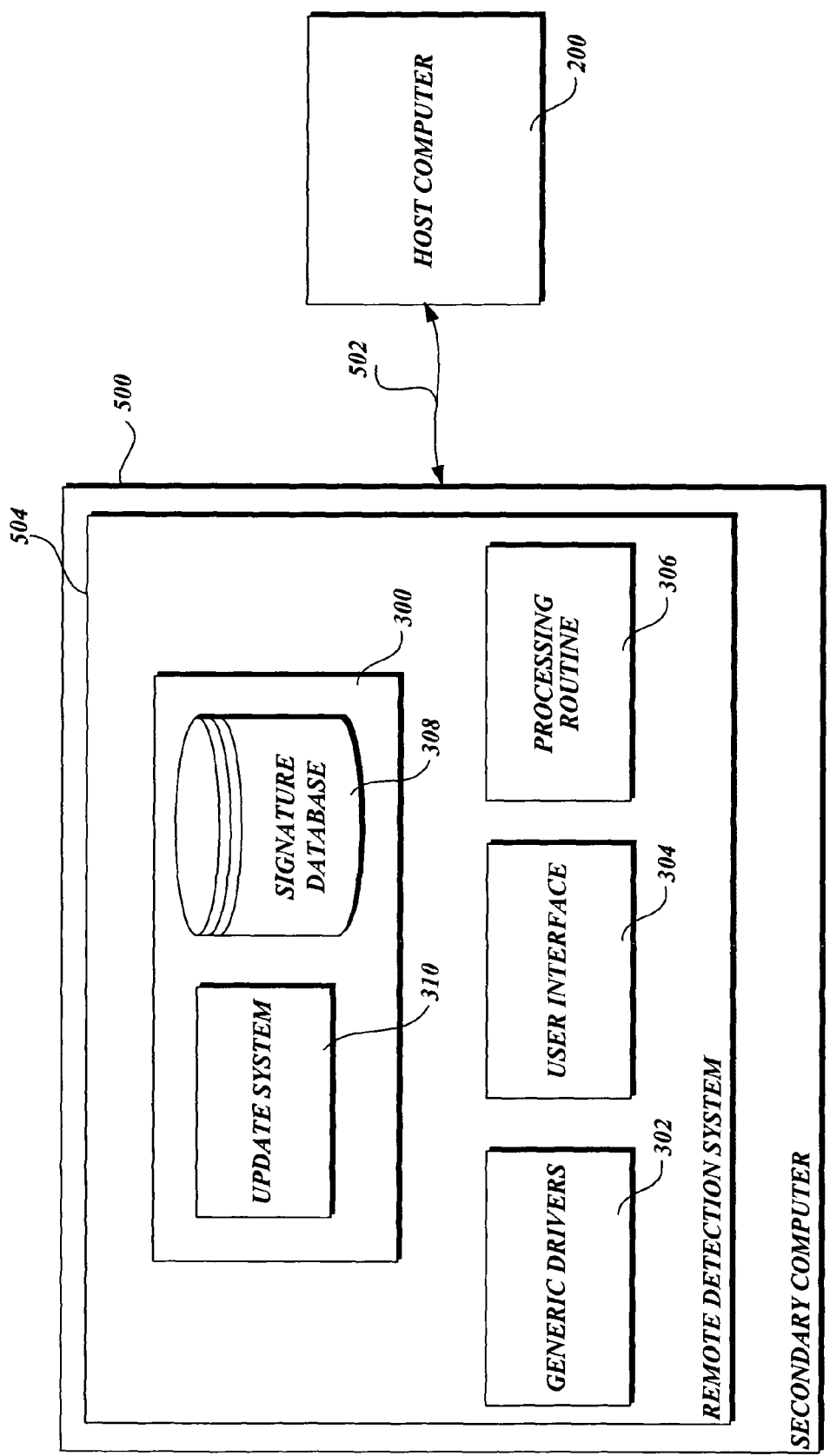
FIG. 5 a block diagram of two computers that illustrates another environment in which aspects of the present invention may be implemented.

As illustrated in FIG. 5, the secondary computer 500 includes a remote detection system 504 with software components that implement aspects of the present invention. More specifically, in this embodiment, the same software components described with reference to FIG. 3 are implemented in the remote detection system 504 (e.g., the scan engine 300 with the associated signature database 308 and update system 310), the generic drivers 302, the user interface 304, and the processing routine 306. Since the functionality implemented by these software components is described above, further description of these components will not be described in detail here.

In the embodiment depicted in FIG. 5, a standalone software application is installed on the secondary computer 500 so that a user, such as system administrator, may cause an analysis of the data loaded in the system memory of the host computer 200 to be performed. More specifically, the remote detection system 504 may be used to determine whether a malware infection exists on the host computer without using software services provided by the host computer 200. In this regard, data that may be indicative of malware is directly accessed from the system memory without relying on an operating system, drivers, and the like on the host computer 200 to access the data. As a result, malware that implements stealth techniques to corrupt software on the host computer 200 is detected by the remote detection system 504.

While illustrative embodiments have been illustrated and described, it will be appreciated that various changes can be made therein without departing from the spirit and scope of the invention.

The invention claimed is:

1. A computer implemented method of determining whether a host computer that includes a system memory for storing data that is accessible to a central processing unit is infected with malware that is being hidden by a rootkit, the method comprising:
    (a) causing a device that is communicatively connected to the host computer through an external port to issue a Direct Memory Access (DMA) request for data loaded in the system memory of the host computer to bypass a rootkit on the host computer, wherein the host computer is infected with the rootkit that hooks into the operating system of the host computer to intercept function calls made to an application program interface of the operating system, and wherein by intercepting the function calls, the rootkit prevents application programs running on the host computer from detecting the presence of malware on the host computer;
    (b) receiving the requested data from the system memory using DMA; and
    (c) determining on the device whether the data obtained from the system memory of the host computer is characteristic of malware.

2. The method as recited in claim 1, further comprising: if the data obtained from the host computer is characteristic of malware providing feedback to a user that indicates the host computer is infected.

3. The method as recited in claim 1, wherein causing a device that is communicatively connected to the host computer through an external port to issue a DMA request for data loaded in the system memory of the host computer, includes:
    (a) identifying a set of highly relevant data loaded in the system memory; and
    (b) issuing the DMA request to a memory controller on the host computer for the set of highly relevant data.

4. The method as recited in claim 3, wherein determining whether the data obtained from the system memory of the host computer is characteristic of malware, includes:
    (a) determining whether the set of highly relevant data is sufficient to definitively identify the malware state of the host computer; and
    (b) if a definitive determination regarding the malware state of the host computer is not capable of being made, issuing a request for additional data via DMA.

5. The method as recited in claim 1, wherein causing a device that is communicatively connected to the host computer through an external port to issue a DMA request for data includes identifying the occurrence of a randomly or regularly scheduled triggering event.

6. The method as recited in claim 1, wherein the DMA request for data loaded in the system memory of the host computer is a low priority request that minimizes the performance impact of determining whether the host computer is infected with malware.

7. The method as recited in claim 1, wherein the device that requests data loaded in the system memory of the host computer is a hot-swappable device that may be connected to the host computer without requiring a reboot.

8. The method as recited in claim 1, wherein determining whether the data obtained from the system memory of the host computer is characteristic of malware, includes:
    (a) generating a signature that uniquely identifies the data obtained from the system memory;
    (b) comparing the signature to signatures associated with malware; and
    (c) performing an integrity check to determine whether data stored in the area of system memory known as a service dispatch table has been overwritten.

9. The method as recited in claim 1, wherein the device that is communicatively connected to the host computer through an external port is a secondary computer with a standalone software application that determines whether the host computer is infected with malware.

10. An apparatus that obtains data from a host computer to determine whether the host computer is infected with malware that is being hidden by a rootkit that hooks into the operating system of the host computer to intercept function calls made to an application program interface of the operating system, and wherein by intercepting the function calls, the rootkit prevents application programs running on the host computer from detecting the malware, the apparatus comprising:
    (a) a physical communication system that forwards data from the host computer to software components stored on the apparatus, the data being forwarded via DMA to bypass a rootkit on the host computer that hooks into the operating system of the host computer to intercept function calls made to an application program interface of the operating system, and wherein by intercepting the function calls, the rootkit prevents application programs running on the host computer from detecting the malware;
    (b) a storage medium for storing software components that obtain and process data obtained from the host computer, wherein the software components include:
        (i) generic drivers for interfacing with hardware on the host computer via DMA;

(ii) a scan engine that determines whether incoming data is characteristic of malware; and (iii) a processing routine operative to obtain data loaded in the system memory of the host computer via DMA over the physical communication system and cause the scan engine to analyze the incoming data for malware.

11. The apparatus as recited in claim 10, further comprising a user interface that provides feedback to a user when the host computer is identified as being infected with malware.

12. The apparatus as recited in claim 10, wherein the physical communication system supports a peer-to-peer communication protocol that allows the apparatus to manage the flow of data from the system memory of the host computer.

13. The apparatus as recited in claim 10, wherein the physical communication system supports a master/slave communication protocol in which a memory controller manages the flow of data from the system memory of the host computer.

14. The apparatus as recited in claim 10, wherein the scan engine includes a signature database that stores signatures derived from known malware; and wherein the scan engine determines whether the host computer is infected with malware by comparing the incoming data to signatures available from the signature database.

15. The apparatus as recited in claim 10, wherein the scan engine includes a heuristic rule database which provides instructions for detecting behaviors that are characteristic of malware.

16. A computer-readable medium that is incorporated into a hardware device that connects to a host computer through an external port, the computer readable medium bearing computer-executable instructions which, when executed by a processor on the hardware device carries out a method of bypassing software services provided by the host computer to determine whether the host computer is infected with malware that is being hidden by a rootkit that hooks into the operating system of the host computer to intercept function calls made to an application program interface of the operating system, and wherein by intercepting the function calls, the rootkit prevents application programs running on the host computer from detecting the malware, the method comprising:

(a) identifying an event that indicates data in the system memory of the host computer will be analyzed for malware, wherein the host computer is infected with a rootkit that hooks into the operating system of the host computer to intercept function calls made to an application program interface of the operating system, and wherein by intercepting the function calls, the rootkit prevents application programs running on the host computer from detecting the malware;

(b) accessing the data in the system memory of the host computer via DMA to bypass the rootkit on the host computer;

(c) receiving a set of data that is loaded in the system memory of the host computer at the hardware device that is communicatively connected to the host computer through an external port; and (d) using software components on the hardware device to determine whether the host computer is infected with malware.

17. The computer readable medium as recited in claim 16, further comprising if the computer is infected with malware:

(a) causing a user interface to provide feedback to a user that indicates the host computer is infected;

(b) disabling the malware by killing processes, deleting files, or removing entries in configuration files that are associated with the malware; and (c) causing the host computer to reboot an image of an operating system provided by the hardware device or a communicatively connected secondary computer.

18. The computer readable medium as recited in claim 16, wherein the event that indicates data in the system memory of the host computer will be analyzed for malware may occur at random or at regularly scheduled intervals.

19. The computer readable medium as recited in claim 17, wherein the user interface comprises a light emitting diode (LED) that is a component of the hardware device.

* * * * *